Patented Feb. 8, 1949

2,461,483

UNITED STATES PATENT OFFICE 2,461,483

OIL BASE DRILLING FLUID

Edward S. Self, Bakersfield, Calif., assignor to Shell Development Company, San Francisco, Calif., a corporation of Delaware No Drawing. Application March 7, 1944,
Serial No. 525,439

7 Claims. (Cl. 252—8.5)

This invention pertains to the drilling of oil and gas wells, and relates more particularly to an improved non-aqueous or oil-base drilling fluid.

In drilling wells by the rotary method, it is necessary to circulate a drilling fluid in the borehole to lubricate the drill bit, to carry the cuttings up to the surface, to hold down the formation pressures, and to form on the walls of the borehole a sheath or cake which prevents the drilling fluid from escaping into the formation.

Drilling fluids of the type most commonly used are water-base muds, consisting of clay suspended in water, to which weighting materials such as barytes, galena, iron oxide, etc., are sometimes added to increase the specific gravity of the mud.

The use of water-base muds involves several disadvantages. The mudsheath formed by water-base muds often has poor plastering properties, that is it is pervious to liquid flow, especially when contaminated by formation brines. When the drill bit starts to penetrate an oil-bearing or producing formation, the hydraulic pressure of the mud fluid column forces the water of the mud through the mudsheath deep into the formation, especially when the pressure of this formation is low. This contaminating water is not expelled by the flow of oil after the well is put on production, but remains adhering to the sand grains, thus plugging the formation and reducing the productivity of the well. In the same manner, this water contaminates the cores which it is customary to obtain during drilling, so that it becomes impossible to determine with accuracy the true or natural fluid content of said cores, and therefore of the formations from which they originate.

Another disadvantage of water-base muds is that the sheath formed thereby often impedes the flow of the oil from the formation into the well, especially when the oil is produced through a perforated liner or screen. Sloughing particles of the mudsheath clog the perforations of the screen during production, and thus reduce or sometimes completely stop the flow of oil into the well.

These difficulties may be eliminated by replacing the water-base mud with an oil-base drilling fluid in which a mineral oil is substituted for water.

An oil-base drilling fluid, in order to perform its desired functions, must comprise, besides the mineral oil and the solid material dispersed therein, a stabilizing agent which prevents the solid material from settling from the oil, and a plastering agent which causes the oil-base drilling fluid to form a fluid-impervious sheath on the walls of the borehole.

As stabilizers for oil-base drilling fluids, it has been proposed to use materials such as lampblack or various types of soap. As plastering agents, it has been proposed to add to the oil-base drilling fluid materials such as blown asphalt.

The preparation in the field of a drilling fluid comprising these many components involves, however, considerable practical difficulties and loss of time.

Thus, in order to blend the asphalt with the oil-base, special mixing and heating arrangements must be provided at the well. A drilling fluid containing lampblack or blown asphalt, moreover, forms a black fluid of unpleasant characteristics, whose use is always objectionable to drilling crews. I have found that oil-base drilling fluids containing only soaps as the stabilizing agent are subject to gas-cutting and frothing, and usually lose their effectiveness upon contamination by water.

It has been found that these difficulties may be eliminated, and an oil-base drilling fluid of excellent properties may be produced by using the stabilizing agent of the present invention. In accordance with the present invention, the stabilizing agent is formed by combining a basic reacting silicate with a material which will produce a soap by reaction with the silicate, and simultaneously release silicic acid from the basic silicate. Both the soap and the silicic acid produced by the reaction contribute to the gel-structure of the drilling fluid of the present invention, and it is believed that the excellent properties of such drilling fluid are due to a coaction of the two gels, the silicic acid gel acting as a protective colloid for the soap gel.

Preferred basic reacting silicates for the purposes of this invention are alkali metal silicates, such as potassium and especially sodium silicates, although other basic reacting silicates may be used if desired.

Preferred neutralizing soap forming materials for the above silicates are any materials consisting of or comprising acids such as fatty acids, for example stearic, palmitic, oleic, linoleic, linolenic acids, etc., it being especially preferred to use the more highly unsaturated acids. These acids may be used either in pure form, or in the form of substances forming a source therefor, for example tall oil. Some other acids besides fatty acids, such as cyclic soap forming acid, for example, naphthenic acids, etc., have also been found suitable for the present invention.

For the base of the drilling fluid of the present invention, I prefer to employ crude oil, although other mineral oils may be employed. The crude oil may vary widely in its gravity, and I have employed, for example, crude oils having A. P. I. gravity as low as 15 and as high as 50. Preferably, however, the A. P. I. gravity of the crude oil is around 25 to 35. Sometimes I find that it is advantageous to blend two different crudes to form the oil base of the drilling fluid of the present invention.

To the mineral oil base there is added a relatively small amount of the desired soap forming material. While I have used as little as 2 per cent, I generally find that from 5 to 10 per cent, or somewhat more by weight of the desired soap forming material is desirable. The most desirable soap forming material is tall oil, a by-product obtained in converting wood fibre into cellulose by the sodium sulphate process and others.

After the tall oil has been added to the crude oil, a basic reacting silicate is further added, in aqueous solution and with agitation, to the mixture. Sodium silicate may be added in an amount as small as 2% and may preferably be added in amount such as 5 or 10 per cent, or any amount necessary to neutralize the tall oil. It is added in the form of commercial aqueous solutions of a concentration such as about 41 Baumé.

After the alkali metal silicate and the desired soap-forming material have been thoroughly mixed with the crude oil, a comminuted solid material may be further added thereto to bring the drilling fluid to a desired specific gravity. As solid or weighting material, it is preferred to add calcium carbonate in forms such as crushed oyster shells, limestone, etc., although other types of solid material, such as fuller's earth, aluminum silicate, clay, barytes, galena or other weighting materials, may be added if desired.

As a typical example of the present composition, the following drilling fluid, used for drilling a well in the Ventura Field in California, may be given:

60 barrels of 30.7 A. P. I. Ventura crude
3¾ drums of tall oil (420 lbs. per drum)
2 drums of sodium silicate, N brand, 41 Baumé (635 lbs. per drum)
140 sacks of ground oyster shells (100 lbs. per sack)

Eighty barrels of a drilling fluid weighing 78 lbs. per cubic foot were obtained from the above mixture. This drilling fluid had extremely good stability properties, no settling taking place during the whole process of drilling. A filter loss test run at 100 lbs. per square inch pressure over a 3 sq. inch area for 60 minutes gave a zero fluid filter loss, indicating the superior sheath-forming properties of the fluid. The drilling fluid had a viscosity of 87 seconds run in a Marsh Funnel containing 1500 cc. with 500 cc. out.

The well was completed with this drilling fluid from 9100 feet to 9946 feet. Large amounts of gas were encountered during this drilling, but the dissolved or occluded gas immediately separated from the mud on passing through a mixing hopper without causing any objectionable gas-cutting or foaming effects. It must be particularly noted that in several wells drilled in the same vicinity with oil-base muds not comprising sodium silicate, considerable difficulties were encountered due to gas-cutting, foaming and water-contamination of the drilling fluid.

It should be noted that the proportions of the tall oil and sodium silicate given above by way of example may be somewhat modified to control the viscosity of the present drilling fluid, and that further amounts of these agents may be added thereto during drilling to maintain the viscosity at a desired value. The addition of the tall oil results in a decrease of the viscosity of the drilling fluid, and the addition of sodium silicate results in its increase.

Due to the high plastering properties of the present fluid, substantially no loss occurred during the whole process of drilling the above Ventura well. The present drilling fluid may therefore be economically used in drilling a well throughout its total depth, instead of starting the drilling with a water-base mud and switching to an oil-base mud upon reaching the producing formation, as is customary at present.

I claim as my invention:

1. A non-aqueous drilling fluid comprising a mineral oil, a finely divided solid material suspended therein, and a stabilizing agent in an amount sufficient to prevent substantial separation of said solid material formed by the reaction of an alkali metal silicate with a soap forming fatty acid.

2. An oil base drilling fluid comprising a crude oil base and a finely divided solid material dispersed therein and a stabilizing agent in an amount sufficient to prevent substantial separation of said solids formed by the reaction of tall oil with sodium silicate.

3. A non-aqueous drilling fluid comprising a California crude oil base of about 15 to 50 A. P. I. gravity, crushed oyster shells dispersed therein, and a stabilizing agent formed from about 2 to 10 percent tall oil by weight and about 2 to 10 percent sodium silicate.

4. An oil-base drilling fluid comprising a mineral oil, a finely divided solid material dispersed therein, and a stabilizing agent in an amount sufficient to prevent substantial separation of said solid material, said stabilizing agent being formed by the reaction of a basic silicate and a neutralizing soap-forming material.

5. An oil-base drilling fluid comprising a mineral oil-base and a stabilizing agent formed by the reaction of from 2% to 10% of a basic silicate with from 2% to 10% of a neutralizing soap-forming material.

6. An oil-base drilling fluid comprising a mineral oil-base and a stabilizing agent formed by the reaction of from 2% to 10% of an alkali metal silicate and from 2% to 10% of an unsaturated soap-forming fatty acid.

7. An oil-base drilling fluid comprising a mineral oil, a finely divided solid material, and a stabilizing agent in an amount sufficient to prevent substantial separation of said solid material in the presence of water, said stabilizing agent being formed by the reaction of an aqueous solution of sodium silicate with tall oil.

EDWARD S. SELF.

REFERENCES CITED

The following references are of record in the file of this patent:

UNITED STATES PATENTS

| Number | Name | Date |
|---|---|---|
| 2,350,154 | Dawson et al. | May 30, 1944 |
| 2,360,992 | Weiss | Oct. 24, 1944 |